United States Patent [19]

Kodera et al.

[11] 4,442,512
[45] Apr. 10, 1984

[54] ULTRASONIC WAVE TRANSMITTING AND RECEIVING DEVICE FOR VEHICLES

[75] Inventors: Masao Kodera; Sigeyuki Akita, both of Okazaki, Japan

[73] Assignee: Nippon Soken, Inc., Nishio, Japan

[21] Appl. No.: 255,275

[22] Filed: Apr. 17, 1981

[30] Foreign Application Priority Data

Jul. 1, 1980 [JP] Japan ............................ 55-93372[U]

[51] Int. Cl.³ ............................................. G01S 15/93
[52] U.S. Cl. ..................................... 367/87; 181/400;
181/177; 340/90 A; 367/112; 367/909
[58] Field of Search ................. 367/87, 112, 116, 140,
367/188, 909, 910; 181/123, 124, 152, 155, 177,
179, 187, 188, 191, 195, 196, 400; 340/32, 34, 52
H, 53; 73/617

[56] References Cited

U.S. PATENT DOCUMENTS

| 1,368,736 | 2/1921 | Lavigne | 340/34 |
| 1,423,802 | 7/1922 | Hofstatter | 340/34 |
| 2,467,301 | 4/1949 | Firestone | 73/617 |
| 2,974,304 | 3/1961 | Nordlund | 367/112 X |
| 3,842,397 | 10/1974 | Sindle | 367/112 X |

FOREIGN PATENT DOCUMENTS

| 872457 | 4/1953 | Fed. Rep. of Germany | 340/34 |
| 781088 | 5/1935 | France | 340/34 |
| 173537 | 12/1921 | United Kingdom | 340/34 |

*Primary Examiner*—Richard A. Farley
*Attorney, Agent, or Firm*—Cushman, Darby & Cushman

[57] ABSTRACT

An ultrasonic wave transmitter and receiver adapted to be mounted on the rear portion of a vehicle to detect the distance between the rear end of the vehicle and any obstruction located at the rear side of the vehicle. The ultrasonic wave transmitter and receiver includes an ultrasonic transducer attached to a lower part of the vehicle at a portion spaced from the rear end of the vehicle in the forward direction of the vehicle by a predetermined distance, a horn opening rearwardly from the vehicle and a wave guide tube through which the horn and the ultrasonic transducer are coupled to each other. The distance between the ultrasonic transducer and the rear end of the vehicle is selected to correspond to a time length which is long enough to sufficiently attenuate the residual oscillation of the ultrasonic transducer.

1 Claim, 9 Drawing Figures

ULTRASONIC WAVE TRANSMITTING AND RECEIVING DEVICE FOR VEHICLES

BACKGROUND OF THE INVENTION

The present invention relates to an ultrasonic transmitter and receiver for vehicles and, more particularly, to an ultrasonic wave transmitter and receiver adapted to transmit an ultrasonic wave and to receive the echo reflected by an obstruction at the rear side of a vehicle to detect the distance between the vehicle and the obstruction.

In the known device of the kind mentioned above, an ultrasonic transducer is mounted in the vicinity of the rear bumper of the vehicle. In this known device, the vibration of the ultrasonic transducer at the time of the transmission of ultrasonic pulses remains as an attenuated oscillation even in the beginning period of receiving of the echo. Since the ultrasonic transducer is mounted in the vicinity of the bumper as stated above, it is difficult to discriminate the echo signal reflected by the obstruction from the wave of the above-mentioned attenuated oscillation. In consequence, it is quite difficult to detect the distance between the rear bumper and the backward obstruction close to the bumper in which the driver is most interested during reversing of the vehicle.

SUMMARY OF THE INVENTION

It is, therefore, an object of the invention to provide an ultrasonic transmitter and receiver for vehicles capable of obviating the above-described problems of the prior art.

To this end, according to the invention, provided is an ultrasonic transmitter and receiver for vehicles comprising an ultrasonic transducer mounted at a portion of the vehicle spaced from the rear bumper of the vehicle in the forward direction by a distance corresponding to a time length which is long enough to sufficiently reduce the level of the attenuated oscillation of the ultrasonic transducer, a horn for providing a predetermined directivity, and a wave guide tube for coupling the horn to the ultrasonic transducer.

According to this arrangement, the echo signal from an obstruction close to the rear bumper is received after a sufficient attenuation of the oscillation of the transducer to facilitate the discrimination of the reflected echo signal from the attenuated oscillation signal, thereby to permit the reliable detection of an obstruction close to the rear bumper of the vehicle.

Thus, according to the invention, it becomes possible to detect the distance between the rear bumper and the obstruction in the close proximity of the rear bumper in which the driver is most interested during reversing, without being accompanied by any deterioration of the performance for detecting the obstruction.

The above and other objects, as well as advantageous features of the invention will become clear from the following description of the preferred embodiments taken in conjunction with the accompanying drawings.

PREFERRED EMBODIMENTS OF THE INVENTION

Figure 1:
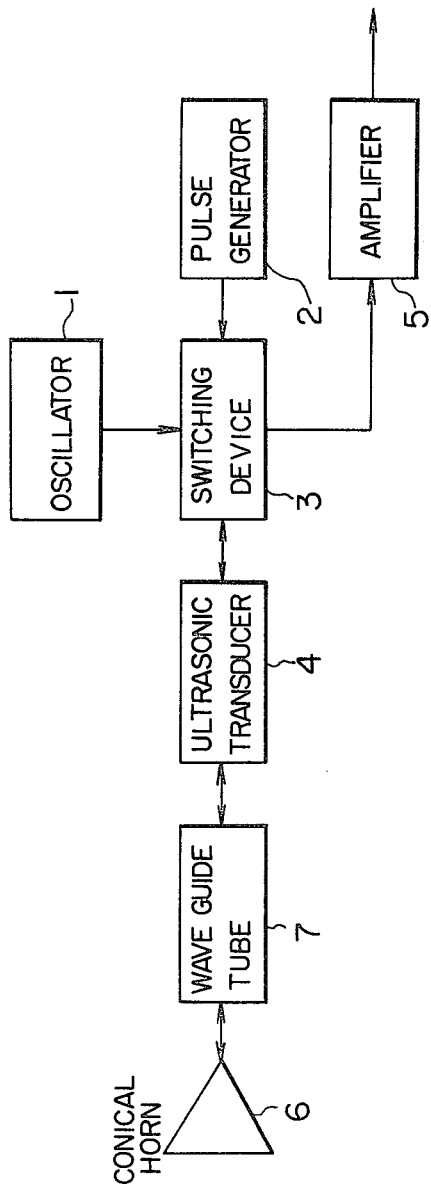
FIG. 1 is a block diagram showing the arrangement and constitution of functional elements of the device in accordance with the present invention.

Referring first to FIG. 1 showing an embodiment of the invention, a reference numeral 1 denotes an oscillator adapted to oscillate at a carrier wave frequency for the transmitted ultrasonic wave pulse, while a reference numeral 2 designates a pulse generator adapted for generating a transmission/receiving change-over signal, while a reference numeral 3 designates a transmission/receiving switching device adapted to operate in response to the transmission/receiving change-over signal. An ultrasonic transducer designated at a reference numeral 4 is adapted to make the transmission and receiving of the ultrasonic pulses. Reference numerals 5, 6 and 7 denote, respectively, an amplifier, a conical horn for providing a predetermined directivity and a wave guide tube for coupling the ultrasonic transducer 4 and the conical horn 6.

Figure 3:
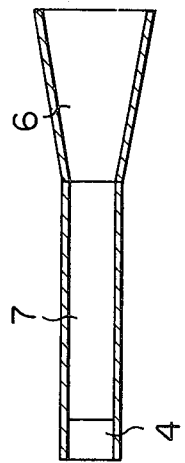
FIG. 3 is a sectional view showing the detailed construction of an essential part of the device.
Figure 2:
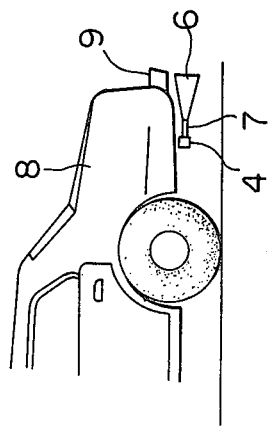
FIG. 2 is a schematic side elevational view showing the state of mounting of the device on a vehicle.

In addition, as shown in FIG. 2, the ultrasonic transducer 4 is attached to a lower portion of the vehicle 8 at a position spaced forwardly from a rear bumper 9 by a predetermined distance. The open end of the conical horn 6 is positioned substantially flush with the reamost portion of the vehicle such as the end of the rear bumper 9. As will be seen from FIG. 3, the ultrasonic transducer 4 is attached to one end of the cylindrical wave guide tube 7 which in turn is connected at its other end to the conical horn 6. The conical horn 6 and the wave guide tube 7 may be formed as a unit beforehand.

The operation of this device will be explained hereinunder with reference to FIGS. 4a to 4d.

Figure 4A:
FIGS. 4a to 4d are wave form charts of various signals, for use in the explanation of operation of the device.
Figure 4B:

When the transmission/receiving changer-over signal from the pulse generator 2 takes the high level "1" as shown in FIG. 4a, the ultrasonic transducer 4 is made to oscillate by the output of the oscillator 2 through the transmission/receiving switching device 3, so that an ultrasonic wave is transmitted through the wave guide tube 7 and the horn 6.

Figure 4C:
Figure 4D:
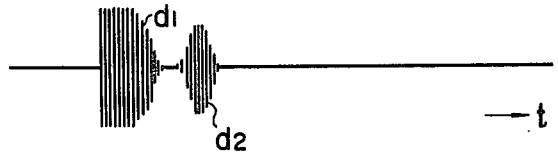

Then, after elapse of a predetermined time, the transmission/receiving switching signal as shown in FIG. 4a comes to take the low level "0", so that the ultrasonic transducer 4 is connected to the amplifier 5 to prepare for the receiving of the echo. In this state, the oscillation of the ultrasonic transducer 4, caused by the oscillation signal (see FIG. 4b), is not extinguished but remains as an attenuated oscillation as shown in FIG. 4c. In consequence, the output from the amplifier 5 involves a signal $d_1$ produced by the attenuated oscillation, as shown in FIG. 4d.

According to the invention, however, the level of this signal $d_1$ is sufficiently low, because the ultrasonic transducer 4 is placed at such a position spaced from the rear bumper by a distance corresponding to the time length which is long enough to sufficiently lower the level of the attenuated oscillation. It is, therefore, possible to clearly discriminate the echo signal $d_2$ from an obstruction in the vicinity of the rear bumper 9 from the above-mentioned signal $d_1$ produced by the attenuated oscillation, to inform the driver of the distance from the obstruction in the close proximity of the rear bumper in which the driver is most interested during the reversing of the vehicle.

Figure 5:
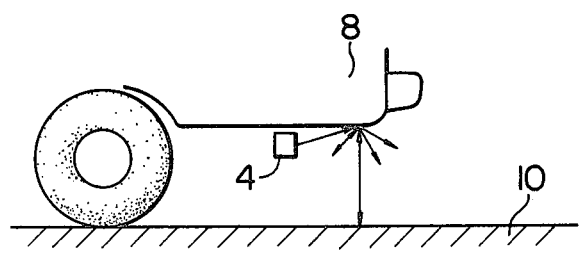
FIG. 5 is a schematic illustration of the operation of a device having an ultrasonic transducer solely.

If the ultrasonic transducer 4 solely is mounted at the above-mentioned position on the vehicle, the transmission and receiving of the ultrasonic wave will be hindered by the lower structure of the vehicle 8 as will be understood from FIG. 5. In addition, the transducer receive various noise echos produced by the multi-reflection between the lower structure of the vehicle 8 and the road surface 10.

The above-described phenomenon may be avoided by restricting or narrowing the beam of the ultrasonic wave by a reflector or the like. Such a reflector, however, is too large to be mounted on the vehicle body.

According to the invention, this problem is overcome because the ultrasonic wave is transmitted and received by the ultrasonic transducer 4 through the wave guide tube 7 and the conical horn 6. It will be seen that the use of the combination of the wave guide tube 7 and the conical horn 6 eliminates the disturbance caused by the echos reflected by the multi-reflection between the lower structure of the vehicle 8 and the road surface 10.

Figure 6:
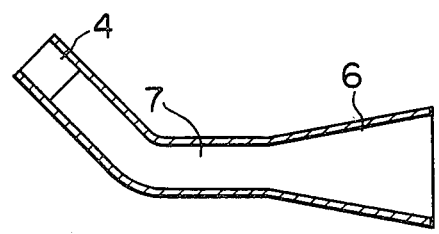
FIG. 6 is a sectional view showing the construction of an essential part of another embodiment of the invention.

FIG. 6 shows another embodiment of the invention in which the wave guide tube 7 is bent at a predetermined radius of curvature. The ultrasonic wave from the ultrasonic transducer 4 and the ultrasonic wave received through the conical horn 6 are transferred along the curved wave guide horn 7 to ensure the substantially equal effect to that of the preceding embodiment. In addition, it is possible to mount the ultrasonic transducer at a downward posture to protect the same against invasion by water which may, for otherwise, take place during running of the vehicle. In addition, the wave guide tube 7 may be bent at a predetermined angle.

What is claimed is:

1. An ultrasonic wave transmitting and receiving device adapted to be mounted on a vehicle, particularly at the rear end portion of said vehicle, said device having an ultrasonic transducer adapted for transmitting an ultrasonic transducer wave which is an attenuated oscillation when a pulse is generated and for receiving an echo reflected by an obstruction, characterized by comprising:

a horn opening rearwardly from said vehicle;

an ultrasonic transducer attached to said vehicle at a position spaced in the forward direction of said vehicle from a rear bumper; and a waveguide tube connecting to said ultrasonic transducer and said horn, said waveguide tube being long enough to sufficiently lower the level of the attenuated oscillation of the pulse ultrasonic wave and being bent at a predetermined radius of curvature.

* * * * *